United States Patent
Febry et al.

(10) Patent No.: US 12,454,746 B2
(45) Date of Patent: Oct. 28, 2025

(54) FERRITIC STAINLESS STEEL FOR SOLID OXIDE FUEL CELL

(71) Applicant: JFE STEEL CORPORATION, Tokyo (JP)

(72) Inventors: Muhammad Febry, Tokyo (JP); Tetsuyuki Nakamura, Tokyo (JP); Takayoshi Yano, Tokyo (JP); Masataka Yoshino, Tokyo (JP); Reiko Sugihara, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 547 days.

(21) Appl. No.: 17/904,954

(22) PCT Filed: Feb. 19, 2021

(86) PCT No.: PCT/JP2021/006477
§ 371 (c)(1),
(2) Date: Aug. 25, 2022

(87) PCT Pub. No.: WO2021/177063
PCT Pub. Date: Sep. 10, 2021

(65) Prior Publication Data
US 2023/0119504 A1  Apr. 20, 2023

(30) Foreign Application Priority Data
Mar. 2, 2020 (JP) .................. 2020-035204

(51) Int. Cl.
*C22C 38/54* (2006.01)
*C22C 38/00* (2006.01)
(Continued)

(52) U.S. Cl.
CPC ............ *C22C 38/54* (2013.01); *C22C 38/002* (2013.01); *C22C 38/005* (2013.01); *C22C 38/02* (2013.01);
(Continued)

(58) Field of Classification Search
CPC ........ C21D 9/46; C21D 8/0205; C21D 6/004; C22C 38/02; C22C 38/04; C22C 38/06;
(Continued)

(56) References Cited

U.S. PATENT DOCUMENTS 9,920,409 B2 * 3/2018 Mizutani ............... C22C 38/002
10,544,490 B2 * 1/2020 Hatano .................. H01M 8/06
(Continued)

FOREIGN PATENT DOCUMENTS

| CN | 103210104 A | 7/2013 |
|---|---|---|
| CN | 104160054 A | 11/2014 |

(Continued)

OTHER PUBLICATIONS

Dec. 1, 2023, Office Action issued by the Taiwan Intellectual Property Office in the corresponding Taiwanese Patent Application No. 112132414 with English language concise statement of relevance.
(Continued)

*Primary Examiner* — Jie Yang
(74) *Attorney, Agent, or Firm* — KENJA IP LAW PC

(57) ABSTRACT

Having a chemical composition (1) containing 0.15 mass % to 1.00 mass % of Nb, and (2) containing 0.0005 mass % to 0.0100 mass % of Mg, where (3) the Al content is controlled in a range of 0.55 mass % to 2.00 mass %, and (4) a relationship of 0.0004≤[Mg]/[Al]≤0.0050 is further satisfied.

2 Claims, 1 Drawing Sheet

(51) Int. Cl.
  *C22C 38/02* (2006.01)
  *C22C 38/04* (2006.01)
  *C22C 38/06* (2006.01)
  *C22C 38/42* (2006.01)
  *C22C 38/44* (2006.01)
  *C22C 38/46* (2006.01)
  *C22C 38/48* (2006.01)
  *C22C 38/50* (2006.01)
  *C22C 38/52* (2006.01)

(52) U.S. Cl.
  CPC .............. *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01)

(58) Field of Classification Search
  CPC ......... C22C 38/42; C22C 38/44; C22C 38/48; C22C 38/002; H01M 2008/1293; H01M 8/0202; H01M 8/10; H01M 8/12
  See application file for complete search history.

(56) References Cited

U.S. PATENT DOCUMENTS

| | | | |
|---|---|---|---|
| 2013/0177837 A1 | 7/2013 | Nishiyama et al. | |
| 2013/0272912 A1 | 10/2013 | Nakamura et al. | |
| 2015/0010771 A1 | 1/2015 | Mizutani et al. | |
| 2015/0044085 A1 | 2/2015 | Kanno et al. | |
| 2017/0321310 A1* | 11/2017 | Hatano | C21D 1/76 |
| 2017/0356074 A1 | 12/2017 | Wang | |
| 2018/0305797 A1 | 10/2018 | Nakamura et al. | |
| 2021/0025022 A1 | 1/2021 | Hatano et al. | |
| 2024/0072266 A1* | 2/2024 | Febry | H01M 8/021 |

FOREIGN PATENT DOCUMENTS

| | | |
|---|---|---|
| CN | 104379790 A | 2/2015 |
| EP | 2811044 A1 | 12/2014 |
| EP | 2871251 A1 | 5/2015 |
| EP | 3480334 B1 | 10/2021 |
| JP | H04173939 A | 6/1992 |
| JP | F07145454 A | 6/1995 |
| JP | H07166301 A | 6/1995 |
| JP | H09157801 A | 6/1997 |
| JP | H10280103 A | 10/1998 |
| JP | 2003173795 A | 6/2003 |
| JP | 2003187828 A | 7/2003 |
| JP | 2005206884 A | 8/2005 |
| JP | 2005264298 A | 9/2005 |
| JP | 2010236012 A | 10/2010 |
| JP | 2011162863 A | 8/2011 |
| JP | 2016030855 A | 3/2016 |
| JP | 2016204709 A | 12/2016 |
| JP | 2016211076 A | 12/2016 |
| KR | 1020140117476 A | 10/2014 |
| TW | 201143192 A1 | 12/2011 |
| TW | 201942382 A | 11/2019 |
| WO | 2013114833 A1 | 8/2013 |
| WO | 2017073093 A1 | 5/2017 |
| WO | 2018008658 A1 | 1/2018 |
| WO | 2019189174 A1 | 10/2019 |

OTHER PUBLICATIONS

Feb. 18, 2023, Office Action issued by the China National Intellectual Property Administration in the corresponding Chinese Patent Application No. 202180016347.3 with English language search report.

Aug. 5, 2024, Office Action issued by the Korean Intellectual Property Office in the corresponding Korean Patent Application No. 10-2022-7027876 with English language concise statement of relevance.

Dec. 4, 2024, the Extended European Search Report issued by the European Patent Office in the corresponding European Patent Application No. 21764966.4.

Apr. 19, 2022, Notification of Reasons for Refusal issued by the Japan Patent Office in the corresponding Japanese Patent Application No. 2021-525876 with English language Concise Statement of Relevance.

Apr. 27, 2021, International Search Report issued in the International Patent Application No. PCT/JP2021/006477.

Aug. 26, 2021, Office Action issued by the Taiwan Intellectual Property Office in the corresponding Taiwanese Patent Application No. 110106838 with English language Concise Statement of Relevance.

Nov. 29, 2021, Office Action issued by the Taiwan Intellectual Property Office in the corresponding Taiwanese Patent Application No. 110106838 with English language Concise Statement of Relevance.

Jun. 16, 2023, Office Action issued by the Taiwan Intellectual Property Office in the corresponding Taiwanese Patent Application No. 110106838 with English language concise statement of relevance.

Apr. 13, 2023, Office Action issued by the China National Intellectual Property Administration in the corresponding Chinese Patent Application No. 202180016347.3 with English language concise statement of relevance.

\* cited by examiner

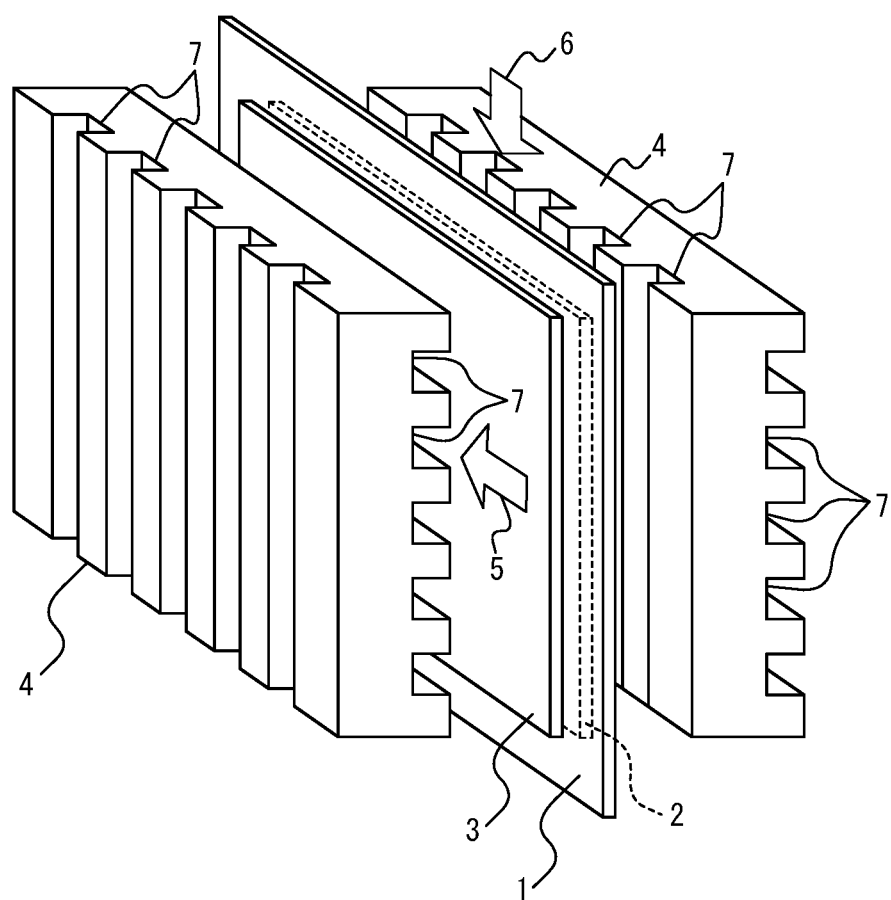

FERRITIC STAINLESS STEEL FOR SOLID OXIDE FUEL CELL

TECHNICAL FIELD

This disclosure relates to a ferritic stainless steel for solid oxide fuel cells that has excellent electrical conductivity and excellent oxidation resistance and chromium poisoning resistance in a high temperature environment containing water vapor.

BACKGROUND

Fuel cells emit fewer harmful gases and generate electricity more efficiently. Therefore, fuel cells are expected to be applied to a wide range of power generation systems, including large-scale power generation, cogeneration systems, and automotive power sources.

Among these, solid oxide fuel cells (hereinafter may be referred to as "solid electrolyte fuel cell") are attracting attention as a next-generation energy source.

Solid oxide fuel cells operate at high temperatures of 500° C. to 900° C. In addition, solid oxide fuel cells have excellent characteristics such as no need to use a catalyst for electrode reactions, being able to use various fuel gases such as coal reforming gas, and being able to be combined with gas turbine or steam turbine power generation or the like utilizing high-temperature exhaust heat.

As an example illustrated in FIG. 1, a solid oxide fuel cell includes an electrolyte 1, a cathode (air electrode) 2 and an anode (fuel electrode) 3 as electrodes, and an interconnector 4 (hereinafter may be referred to as a "separator").

An ion-conductive solid electrolyte such as yttria-stabilized zirconia (YSZ) is usually used as the electrolyte 1. A cathode (air electrode) 2 such as (La, Sr) $MnO_3$ is attached to one side of the electrolyte 1. An anode (fuel electrode) 3 such as Ni/YSZ (cermet of Ni and yttria-stabilized zirconia) is attached to the other side of the electrolyte 1. The electrolyte 1 is used as a partition wall, and electricity is generated by supplying fuel gas 5 such as hydrogen gas on one side and supplying oxidizing gas 6 such as air on the other side.

Further, the interconnector 4 supports the three layers of the electrolyte 1, the cathode (air electrode) 2 and the anode (fuel electrode) 3, and also serves to form a gas flow path 7. The interconnector 4 is also responsible for carrying current.

The components of the solid oxide fuel cell, especially the interconnector, are required to have oxidation resistance, electrical conductivity, thermal expansion matching with other components, and other properties.

Various metallic materials have been proposed as materials used for such components of solid oxide fuel cells.

For example, JP H07-166301 A (PTL 1) describes "a separator of solid electrolyte fuel cells, wherein flat cells in which a fuel electrode and an air electrode are arranged so as to sandwich a solid electrolyte layer are electrically connected in series, a fuel gas or an oxidant gas is distributed to each electrode of the cell, respectively, and the separator is made of an alloy containing Fe 60 wt % to 82 wt % and Cr 18 wt % to 40 wt % and additional elements that reduce the contact resistance with the air electrode of the cell".

JP H07-145454 A (PTL 2) describes "a metal material for solid electrolyte fuel cells, containing Cr 5 wt % to 30 wt %, Co 3 wt % to 45 wt %, and La 1 wt % or less, with the balance being Fe and inevitable impurities".

JP H09-157801 A (PTL 3) describes "a steel for solid electrolyte fuel cell separators, containing, in weight %, at least one selected from C 0.2% or less, Si 0.2% to 3.0%, Mn 0.2% to 1.0%, Cr 15% to 30%, Y 0.5% or less, rare earth element 0.2% or less, and Zr 1% or less, with the balance being Fe and inevitable impurities".

JP H10-280103 A (PTL 4) describes "a steel for solid electrolyte fuel cell separators, containing, in weight %, C 0.2% or less, Si 3.0% or less, Mn 1.0% or less, Cr 15% to 30%, and Hf 0.5% or less, with the balance consisting essentially of Fe".

JP 2003-187828 A (PTL 5) describes: "a ferritic stainless steel for solid oxide fuel cell components, containing, in mass %, C: 0.03% or less, Mn: 2.0% or less, Ni: 0.6% or less, N: 0.03% or less, Cr: 10.0% to 32.0%, and at least one of 2.0% or less of Si or 6.0% or less of Al: 1.5% or more in total, with the balance consisting essentially of Fe".

JP 2005-206884 A (PTL 6) describes: "a Fe—Cr alloy for fuel cells, containing C: 0.20 mass % or less, Si: 1.0 mass % or less, Mn: 1.1 mass % to 2.0 mass %, Cr: 10 mass % to 40 mass %, Al: 1.0 mass % or less, Mo: 0.03 mass % to 5.0 mass %, and Nb: 0.1 mass % to 3.0 mass %, with the contents of Si and Al satisfying Si+Al≤1.2 mass %, and the balance being Fe and inevitable impurities".

WO 2018/008658 A (PTL 7) describes: "a ferritic stainless steel containing, in mass %, C: 0.030% or less, Si: 1.00% or less, Mn: 1.00% or less, P: 0.045% or less, S: 0.0030% or less, Cr: 20.0% to 25.0%, Mo: 0.3% to 2.0%, N: 0.040% or less, Al: 0.50% or less, V: 0.20% or less, and Nb: 0.001% to 0.500% and/or Ti: 0.001% to 0.50%, with the balance being Fe and inevitable impurities".

CITATION LIST

Patent Literature

PTL 1: JP H07-166301 A
PTL 2: JP H07-145454 A
PTL 3: JP H09-157801 A
PTL 4: JP H10-280103 A
PTL 5: JP 2003-187828 A
PTL 6: JP 2005-206884 A
PTL 7: WO 2018/008658 A

SUMMARY

Technical Problem

However, none of the metallic materials described in PTL 1 and PTL 2 have sufficient oxidation resistance, especially oxidation resistance after a long period of time in a high-temperature environment.

Further, the metallic material described in PTL 5 needs to contain a large amount of Si and/or Al. However, when Si and Al are contained in large amounts, insulating oxides form on a surface of the metallic material. Therefore, when the metallic material described in PTL 5 is used in the interconnector of a solid oxide fuel cell, the electrical resistance increases, and the battery performance degrades.

To obtain the above properties required for the interconnector of a solid oxide fuel cell, it is effective to contain Cr in the chemical composition and to form an oxide coating mainly composed of Cr-based oxides such as $Cr_2O_3$ on the surface of the interconnector.

However, when a large amount of Cr is contained in the chemical composition, Cr-based oxides volatilize and adhere to the electrodes at high temperatures, causing performance degradation of the electrodes (hereinafter referred to as "Cr poisoning").

No consideration is given to the suppression of Cr poisoning in any of PTL 3, PTL 4 and PTL 7. Therefore, there is concern about the performance degradation of electrodes due to Cr poisoning when the metallic materials described in PTL 3, PTL 4 and PTL 7 are used in the interconnector of a solid oxide fuel cell.

The metallic material described in PTL6 particularly increases the amount of Mn in the chemical composition, thereby forming $Mn_2O_3$ in the surface oxides to improve the Cr poisoning resistance.

As used herein, the operating environment of the interconnector of a solid oxide fuel cell may contain high-temperature water vapor. Therefore, it is required to improve the oxidation resistance and Cr poisoning resistance in such a high-temperature environment containing water vapor.

However, the oxidation resistance and Cr poisoning resistance in PTL 6 are evaluated in an atmospheric environment, and no consideration is given to the oxidation resistance and Cr poisoning resistance in a high-temperature environment containing water vapor.

It would thus be helpful to provide a ferritic stainless steel for solid oxide fuel cells that has excellent electrical conductivity and excellent oxidation resistance and chromium poisoning resistance, especially excellent oxidation resistance and chromium poisoning resistance in a high temperature environment containing water vapor.

Solution to Problem

We conducted intensive studies to solve the above problems.

As a result, we have found that these problems can be solved by appropriately controlling the chemical composition of the ferritic stainless steel, especially (1) controlling the Nb content to 0.15 mass % to 1.00 mass %, (2) controlling the Mg content to 0.0005 mass % to 0.0100 mass %, (3) then controlling the Al content in a range of 0.55 mass % to 2.00 mass %, and (4) further satisfying the relationship of $0.0004 \leq [Mg]/[Al] \leq 0.0050$ where [Al] and [Mg] are the Al content (mass %) and the Mg content (mass %) in the chemical composition, respectively.

The reason for this is considered as follows.

Both Al and Cr are elements that form oxides on the surface of ferritic stainless steel. However, Al-based oxides such as $Al_2O_3$ are electrical insulators. Therefore, when a large amount of Al is contained in the ferritic stainless steel, an oxide coating formed on the surface of the ferritic stainless steel (hereinafter also referred to as "surface oxide coating") is a coating mainly composed of Al-based oxides. As a result, the electrical resistance increases, and electrical conductivity decreases.

However, when the surface oxide coating is a coating mainly composed of Cr-based oxides, Cr poisoning occurs.

When the Nb content is 0.15 mass % to 1.00 mass % and the Mg content is 0.0005 mass % to 0.0100 mass %, Al in the steel is preferentially oxidized. Further, by controlling the Al content in the range of 0.55 mass % to 2.00 mass % while containing a specified amount of Nb and Mg, it is possible to partially form Cr-based oxides in the surface oxide coating while reducing the thickness of the surface oxide coating mainly composed of Al-based oxides.

Since the surface oxide coating is mainly composed of Al-based oxides, it provides excellent oxidation resistance even in harsh high temperature environments containing water vapor. In the surface oxide coating, Cr-based oxides are partially contained in the Al-based oxides. Therefore, the volatilization of Cr-based oxides is inhibited by the nearby Al-based oxides. As a result, excellent Cr poisoning resistance can be obtained even in harsh environments, such as those high temperature ones containing water vapor. Further, the Cr-based oxides partially formed in the surface oxide coating serve as current paths, which also ensures electrical conductivity.

For these reasons, we believe that a ferritic stainless steel whose chemical composition is appropriately controlled as described in (1) to (3) above and satisfies the relationship in (4) above can achieve both excellent electrical conductivity and excellent oxidation resistance and Cr poisoning resistance.

The present disclosure is based on these discoveries and further studies.

We thus provide the following.

1. A ferritic stainless steel for solid oxide fuel cells, comprising a chemical composition containing (consisting of), in mass %,
    C: 0.025% or less,
    Si: 0.05% to 1.00%,
    Mn: 0.05% to 1.00%,
    P: 0.050% or less,
    S: 0.010% or less,
    Cr: 14.0% to 32.0%,
    Al: 0.55% to 2.00%,
    Ni: 0.01% to 1.00%,
    Nb: 0.15% to 1.00%,
    Mo: 1.05% to 3.00%,
    Mg: 0.0005% to 0.0100%, and
    N: 0.025% or less,
with the balance being Fe and inevitable impurities, wherein a relationship of $0.0004 \leq [Mg]/[Al] \leq 0.0050$ is satisfied, where [Al] and [Mg] are the Al content in mass % and the Mg content in mass % in the chemical composition, respectively.

2. The ferritic stainless steel for solid oxide fuel cells according to 1., wherein the chemical composition further contains, in mass %, at least one selected from the group consisting of
    Cu: 0.01% to 0.50%,
    Co: 0.01% to 1.00%, and
    W: 0.01% to 3.00%.

3. The ferritic stainless steel for solid oxide fuel cells according to 1. or 2., wherein the chemical composition further contains, in mass %, at least one selected from the group consisting of
    Ti: 0.01% to 0.50%,
    V: 0.01% to 0.50%,
    Zr: 0.01% to 0.50%,
    B: 0.0002% to 0.0050%,
    Ca: 0.0002% to 0.0050%, and
    REM: 0.01% to 0.20%.

Advantageous Effect

According to the present disclosure, it is possible to obtain a ferritic stainless steel for solid oxide fuel cells that has excellent electrical conductivity and excellent oxidation resistance and chromium poisoning resistance, especially excellent oxidation resistance and chromium poisoning resistance in a high temperature environment containing water vapor.

BRIEF DESCRIPTION OF THE DRAWINGS

In the accompanying drawing:

FIG. 1 schematically illustrates an example of a solid oxide fuel cell.

DETAILED DESCRIPTION

The following describes some embodiments of the present disclosure.

First, a chemical composition of a ferritic stainless steel for solid oxide fuel cells according to one of the embodiments of the present disclosure is described. The % representations below indicating the chemical composition are in mass % unless stated otherwise.

C: 0.025% or less

C has an effect of increasing the strength at high temperatures. To obtain this effect, the C content is preferably 0.001% or more. The C content is more preferably 0.003% or more. However, if the C content exceeds 0.025%, the toughness and the formability decrease. Therefore, the C content is 0.025% or less. The C content is preferably 0.015% or less and more preferably 0.010% or less.

Si: 0.05% to 1.00%

Si has an effect of improving the oxidation resistance. To obtain this effect, the Si content is 0.05% or more. The Si content is preferably 0.10% or more. However, if the Si content exceeds 1.00%, $SiO_2$ with low electrical conductivity is formed near the interface between the surface oxide coating and the base metal, resulting in a decrease in the electrical conductivity. For this reason, the Si content is 1.00% or less. The Si content is preferably 0.40% or less and more preferably 0.20% or less.

Mn: 0.05% to 1.00%

Mn has an effect of increasing the peel resistance of oxide scales. To obtain this effect, the Mn content is 0.05% or more. The Mn content is preferably 0.10% or more. However, if the Mn content exceeds 1.00%, oxide scales may grow abnormally, resulting in a decrease in the oxidation resistance. In addition, the steel becomes harder at room temperature, resulting in a decrease in the workability. Therefore, the Mn content is 1.00% or less. The Mn content is preferably 0.50% or less and more preferably 0.20% or less.

P: 0.050% or less

P is a harmful element that reduces the toughness of the steel. Accordingly, a lower P content is preferable. Therefore, the P content is 0.050% or less. The P content is preferably 0.040% or less and more preferably 0.030% or less. The lower limit of the P content is not particularly limited. However, since excessive dephosphorization leads to increased costs, the P content is preferably 0.010% or more.

S: 0.010% or less

S is a harmful element that adversely affects the formability and lowers the corrosion resistance, which is a basic property of stainless steel. Accordingly, a lower S content is preferable. Therefore, the S content is 0.010% or less. The S content is preferably 0.005% or less. The lower limit of the S content is not particularly limited. However, since excessive desulfurization leads to increased costs, the S content is preferably 0.0001% or more.

Cr: 14.0% to 32.0%

Cr has an effect of partially forming a $Cr_2O_3$ coating in a surface oxide coating mainly composed of Al oxides to ensure the electrical conductivity. To obtain this effect, the Cr content is 14.0% or more. The Cr content is preferably 16.0% or more and more preferably 18.5% or more. However, if Cr is excessively contained, especially if the Cr content exceeds 32.0%, volatilization of Cr-based oxides is promoted, and the workability is deteriorated. Therefore, the Cr content is 32.0% or less. The Cr content is preferably 24.0% or less, more preferably 22.0% or less, and still more preferably 20.5% or less.

Al: 0.55% to 2.00%

Al has an effect of, by simultaneously containing Nb and Mg, forming oxides preferentially over Cr and improving the oxidation resistance. In addition, Al preferentially forms oxides, which can suppress Cr poisoning of the electrodes due to volatilization of Cr-based oxides. To obtain these effects, the Al content is 0.55% or more. The Al content is preferably 0.85% or more and more preferably 1.00% or more. On the other hand, if the Al content exceeds 2.00%, the steel becomes harder, and the workability decreases. In addition, Cr-based oxides cannot be partially present in the surface oxide coating. Further, the thickness of the surface oxide coating mainly composed of Al-based oxides increases. As a result, the electrical resistance increases. Therefore, the Al content is 2.00% or less. The Al content is preferably 1.60% or less and more preferably 1.25% or less.

Ni: 0.01% to 1.00%

Ni has an effect of improving the toughness and oxidation resistance of the steel. To obtain this effect, the Ni content is 0.01% or more. The Ni content is preferably more than 0.05%. On the other hand, Ni is a y phase-forming element. Therefore, if the Ni content exceeds 1.00%, y phase forms at high temperatures, and the oxidation resistance decreases. The decreases in the oxidation resistance also increases the electrical resistance. Therefore, the Ni content is 1.00% or less. The Ni content is preferably less than 0.50% and more preferably less than 0.20%.

Nb: 0.15% to 1.00%

Nb has an effect of increasing the strength at high temperatures. In addition, Nb has an effect of promoting the oxidation of Al, improving the oxidation resistance, and suppressing the volatilization of Cr oxides. Therefore, Nb is an important element. To obtain these effects, the Nb content is 0.15% or more. The Nb content is preferably 0.25% or more and more preferably 0.30% or more. However, if the Nb content exceeds 1.00%, the steel becomes harder, and the workability decreases. Therefore, the Nb content is 1.00% or less. The Nb content is preferably 0.60% or less, more preferably 0.50% or less, and still more preferably 0.40% or less.

Mo: 1.05% to 3.00%

Mo has an effect of increasing the strength at high temperatures and improving the oxidation resistance. To obtain this effect, the Mo content is 1.05% or more. The Mo content is preferably 1.50% or more, more preferably 1.80% or more, and still more preferably 2.00% or more. On the other hand, if Mo is excessively contained, especially if the Mo content exceeds 3.00%, the steel becomes harder, and the workability decreases. Therefore, the Mo content is 3.00% or less. The Mo content is preferably 2.80% or less, more preferably 2.40% or less, and still more preferably 2.30% or less.

Mg: 0.0005% to 0.0100%

Mg is an essential element because it preferentially oxidizes Al in the steel to make the surface oxide coating into a coating mainly composed of Al-based oxides. In addition, Mg is an essential element because it partially provides Cr-based oxides in the surface oxide coating. In other words, Mg is an essential element for obtaining the effect of achieving both excellent electrical conductivity, and excellent oxidation resistance and Cr poisoning resistance. To obtain these effects, the Mg content is 0.0005% or more. The Mg content is preferably 0.0010% or more and more preferably 0.0015% or more. On the other hand, if Mg is excessively contained, especially if the Mg content exceeds 0.0100%, the thickness of the surface oxide coating mainly composed of Al-based oxides increases, and the electric resistance increases. Therefore, the Mg content is 0.0100% or less. The Mg content is preferably 0.0050% or less and more preferably 0.0025% or less.

N: 0.025% or less

N is an element that deteriorates the toughness and formability of the steel. Accordingly, a lower N content is preferable. Particularly when the N content exceeds 0.025%, the toughness and formability may significantly decrease. Therefore, the N content is 0.025% or less. The N content is preferably less than 0.010%. The lower limit of the N content is not particularly limited. However, since excessive denitrogenation leads to increased costs, the N content is preferably 0.001% or more.

The basic chemical composition of the ferritic stainless steel for solid oxide fuel cells according to one of the embodiments of the present disclosure has been described above. Further, it is important to satisfy the relationship of $0.0004 \leq [Mg]/[Al] \leq 0.0050$.

As used herein, [Al] and [Mg] are the Al content (mass %) and the Mg content (mass %) in the chemical composition, respectively.

$0.0004 \leq [Mg]/[Al] \leq 0.0050$

When [Mg]/[Al], which is a ratio of the Mg content to the Al content in the chemical composition, is small, especially when it is less than 0.0004, the amount of Cr-based oxides contained in the surface oxide coating increases. As a result, Cr poisoning occurs. On the other hand, when [Mg]/[Al] exceeds 0.0050, the thickness of the surface oxide coating mainly composed of Al-based oxides increases. As a result, the electrical resistance increases. Therefore, it is necessary to satisfy $0.0004 \leq [Mg]/[Al] \leq 0.0050$. [Mg]/[Al] is preferably 0.0010 or more. In addition, [Mg]/[Al] is preferably 0.0030 or less.

The chemical composition of the ferritic stainless steel for solid oxide fuel cells according to one of the embodiments of the present disclosure may further contain one or both of the following (a) and (b).

(a) At least one selected from the group consisting of Cu: 0.01% to 0.50%, Co: 0.01% to 1.00%, and W: 0.01% to 3.00%

(b) At least one selected from the group consisting of Ti: 0.01% to 0.50%, V: 0.01% to 0.50%, Zr: 0.01% to 0.50%, B: 0.0002% to 0.0050%, Ca: 0.0002% to 0.0050%, and REM: 0.01% to 0.20%

Cu: 0.01% to 0.50%

Cu has an effect of improving the corrosion resistance of the steel. To obtain this effect, the Cu content is preferably 0.01% or more. The Cu content is more preferably 0.05% or more and still more preferably 0.10% or more. On the other hand, if the Cu content exceeds 0.50%, oxide scales are easily peeled off, resulting in a decrease in the oxidation resistance. Therefore, when Cu is contained, the Cu content is 0.50% or less. The Cu content is preferably 0.30% or less and more preferably 0.10% or less.

Co: 0.01% to 1.00%

Co has an effect of improving the toughness of the steel. To obtain this effect, the Co content is preferably 0.01% or more. The Co content is more preferably 0.03% or more and still more preferably 0.05% or more. On the other hand, if the Co content exceeds 1.00%, the toughness and workability of the steel decrease. Therefore, when Co is contained, the Co content is 1.00 or less. The Co content is preferably less than 0.30% and more preferably 0.10% or less.

W: 0.01% to 3.00%

W, like Mo, has an effect of increasing the strength at high temperatures by solid solution strengthening. To obtain this effect, the W content is preferably 0.01% or more. The W content is more preferably 0.30% or more and still more preferably 1.00% or more. On the other hand, if the W content exceeds 3.00%, the steel becomes harder, and the workability decreases. In addition, tough scales are formed in an annealing process during manufacturing, rendering the descaling during pickling difficult. Therefore, when W is contained, the W content is 3.00% or less. The W content is preferably 2.00 or less and more preferably 1.50% or less.

Ti: 0.01% to 0.50%

Ti has an effect of improving the workability and oxidation resistance of the steel. To obtain this effect, the Ti content is preferably 0.01% or more. The Ti content is more preferably 0.03% or more and still more preferably 0.05% or more. However, if the Ti content exceeds 0.50%, coarse Ti (C, N) precipitation is caused, which not only lowers the toughness but also deteriorates the surface characteristics. Therefore, when Ti is contained, the Ti content is 0.50% or less. The Ti content is preferably 0.35% or less and more preferably 0.20% or less.

V: 0.01% to 0.50%

V has an effect of improving the workability and oxidation resistance of the steel. To obtain this effect, the V content is preferably 0.01% or more. The V content is more preferably 0.03% or more and still more preferably 0.05% or more. However, if the V content exceeds 0.50%, coarse V (C and N) precipitation is caused, which not only lowers the toughness but also deteriorates the surface characteristics. Therefore, when V is contained, the V content is 0.50% or less. The V content is preferably 0.30% or less and more preferably 0.15% or less.

Zr: 0.01% to 0.50%

Zr has an effect of improving the oxidation resistance. To obtain this effect, the Zr content is preferably 0.01% or more. The Zr content is more preferably 0.05% or more. However, if the Zr content exceeds 0.50%, Zr intermetallic compounds precipitate, which embrittles the steel. Therefore, when Zr is contained, the Zr content is 0.50% or less. The Zr content is preferably 0.25% or less and more preferably 0.10% or less.

B: 0.0002% to 0.0050%

B has an effect of improving the workability of the steel, especially the secondary workability. To obtain this effect, the B content is preferably 0.0002% or more. The B content is more preferably 0.0005% or more. On the other hand, if the B content exceeds 0.0050%, BN forms, and the workability decreases. Therefore, when B is contained, the B content is 0.0050% or less. The B content is preferably 0.0020% or less and more preferably 0.0010% or less.

Ca: 0.0002% to 0.0050%

Ca has an effect of preventing the blocking of nozzle caused by the precipitation of inclusions that are likely to occur during continuous casting. To obtain this effect, the Ca content is preferably 0.0002% or more. The Ca content is more preferably 0.0005% or more. On the other hand, if the Ca content exceeds 0.0050%, surface defects are likely to occur. Therefore, when Ca is contained, the Ca content is 0.0050% or less. The Ca content is preferably 0.0030% or less and more preferably 0.0020% or less.

REM: 0.01% to 0.20%

REM is a generic term for Sc, Y, La, Ce, Pr, Nd, Pm, Sm, and Hf. REM has an effect of improving the adhesion of the oxide scale and improving the oxidation resistance. To obtain this effect, the REM content is preferably 0.01% or more. The REM content is more preferably 0.05% or more. On the other hand, if the REM content exceeds 0.20%, surface defects are likely to occur. Therefore, when REM is contained, the REM content is 0.20% or less. The REM content is preferably 0.10% or less.

The balance other than the above is Fe and inevitable impurities.

The microstructure of the ferritic stainless steel for solid oxide fuel cells according to one of the embodiments of the present disclosure is a ferrite single-phase structure (volume fraction: 100%).

In this case, the identification of the microstructure (calculation of the volume fraction of ferrite phase) is performed as follows.

A test specimen for cross-sectional observation is taken from the ferritic stainless steel for solid oxide fuel cells and subjected to etching treatment with a picric acid saturated hydrochloric acid solution. Then, the test specimen for cross-sectional observation is observed under an optical microscopy at 100× magnification for 10 fields of view, and the microstructural shape and the etching strength are analyzed to identify ferrite phase. Then, the volume fraction of the ferrite phase is determined by image processing for each field of view, and the results are averaged. The volume fraction of the ferrite phase is calculated excluding intermetallic compounds, precipitates, and inclusions.

The ferritic stainless steel for solid oxide fuel cells according to one of the embodiments of the present disclosure may be formed into, for example, a plate-like shape (e.g., a steel sheet) or part shape.

The thickness of the ferritic stainless steel sheet formed into a plate-like shape (e.g., a steel sheet) or part shape (hereinafter may be simply referred to as "the thickness of the steel sheet") is not particularly limited. However, from the viewpoint of oxidation resistance, Cr poisoning resistance and workability, the thickness of the steel sheet is suitably 0.01 mm to 10.0 mm. The thickness of the steel sheet is preferably 0.03 mm or more. The thickness of the steel sheet is preferably 8.0 mm or less and more preferably 2.0 mm or less.

Next, a suitable production method of the ferritic stainless steel for solid oxide fuel cells according to one of the embodiments of the present disclosure will be described.

Molten steel is prepared by smelting in a melting furnace such as a converter or an electric furnace. Then, the molten steel is subjected to secondary refining by ladle refining or vacuum refining to adjust the chemical composition as described above. Then, the molten steel is made into a semi-finished product (slab) by continuous casting or ingot casting and blooming. Continuous casting is preferred in terms of productivity and quality. Then, the semi-finished product (slab) is subjected to hot rolling to obtain a hot-rolled steel sheet. The hot-rolled steel sheet may be further subjected to additional processes such as hot-rolled sheet annealing and/or acid cleaning. Hereinafter, when simply referring to a hot-rolled steel sheet, it is intended to include not only a steel sheet as hot-rolled (including a steel sheet obtained by subjecting a steel sheet as hot-rolled to acid cleaning and/or other additional processes) but also a so-called hot-rolled and annealed sheet (including a steel sheet obtained by subjecting a steel sheet as hot-rolled to hot-rolled sheet annealing, and a steel sheet obtained by further subjecting the steel sheet after subjection to the hot-rolled sheet annealing to acid cleaning and/or other additional processes). Depending on the application, a hot-rolled steel sheet can be used as-is as a product without subjection to subsequent processes such as cold rolling (hereinafter also referred to as a "hot-rolled product"). For example, in the case of manufacturing a housing of a solid oxide fuel cell, a hot-rolled steel sheet can be used as it is.

Then, the hot-rolled steel sheet is subjected to cold rolling to obtain a cold-rolled steel sheet. Then, the cold-rolled steel sheet is subjected to other subsequent processes such as finish annealing (cold-rolled sheet annealing) and acid cleaning to obtain a product such as a cold-rolled and annealed sheet (hereinafter also referred to as a "cold-rolled product"). Examples of the cold-rolled and annealed sheet include a steel sheet obtained by subjecting a steel sheet as cold-rolled to final annealing (cold-rolled sheet annealing), and a steel sheet obtained by further subjecting the steel sheet after subjection to the final annealing (cold-rolled sheet annealing) to acid cleaning and/or other additional processes. The atmosphere for cold-rolled sheet annealing is not particularly restricted. For example, bright annealing (BA) may be performed in a reducing atmosphere such as hydrogen, in which case acid cleaning may be omitted. Prior to the acid cleaning, descaling may be performed by shot blasting or mechanical descaling.

The ferritic stainless steel for solid oxide fuel cells according to one of the embodiments of the present disclosure can be produced as described above.

The above processes may be performed under the conditions in accordance with conventional methods.

For example, when a semi-finished product (slab) is heated before subjection to hot rolling, it is suitably heated to a temperature of 1050° C. to 1250° C.

The hot-rolled sheet annealing is preferably performed in a temperature range of 900° C. to 1150° C. by continuous annealing.

The cold rolling may be performed once or twice or more with intermediate annealing in between. From the viewpoint of productivity and required quality, it is preferable that the cold rolling be performed twice or more with intermediate annealing in between. The cold rolling is performed at a total rolling reduction ratio of preferably 50% or more and more preferably 60% or more.

The final annealing (cold-rolled sheet annealing) is preferably performed in a temperature range of 900° C. to 1150° C. by continuous annealing. A more preferable temperature range is 950° C. to 1100° C.

Further, depending on the application, the final annealing may be followed by skin pass rolling or other processes to adjust the shape, roughness on the sheet surface, and material properties of the steel sheet.

The hot-rolled product and cold-rolled product thus obtained are then cut, bent, and subjected to bulging, reducing and other processes depending on the application, and formed into solid electrolyte fuel cell-related components, such as an interconnector, a cell frame, a cell sealant, an end plate, and a reformer.

For example, arc welding such as metal inert gas (MIG), metal active gas (MAG) and tungsten inert gas (TIG), resistance welding such as spot welding and seam welding, high-frequency resistance welding such as electric resistance welding, and high-frequency induction welding may be applied to form these components.

EXAMPLES

Steel samples with the chemical compositions listed in Table 1 (with the balance being Fe and inevitable impurities) were prepared by smelting in a vacuum melting furnace and cast into steel ingots of 30 kg in weight. Each steel ingot was heated to 1250° C. and then formed into a sheet bar of 30 mm thick by hot rolling. After being heated to 1150° C., the sheet bar was hot rolled to obtain a hot-rolled steel sheet. The hot-rolled steel sheet was subjected to hot-rolled sheet annealing at temperatures of 800° C. to 1100° C., and then ground to obtain a hot-rolled and annealed sheet with a thickness of 4.0 mm. Then, the hot-rolled and annealed sheet was cold rolled to obtain a cold-rolled steel sheet. Then, the cold-rolled steel sheet was subjected to final annealing at temperatures of 750° C. to 1100° C. to obtain a cold-rolled and annealed sheet with a thickness of 1.0 mm. Then, the front and back surfaces of the cold-rolled and annealed sheet were polished with #800 emery paper, and the polished cold-rolled and annealed sheet was used to evaluate the oxidation resistance, the Cr poisoning resistance, and the electrical conductivity in the following manner. The evaluation results are listed in Table 2.

When the microstructure of each cold-rolled and annealed sheet was identified with the method described above, it was found that they all had a ferrite single-phase structure (volume fraction of ferrite phase: 100%).

<Evaluation of Oxidation Resistance>

A sample of 1.0 mm×20 mm×20 mm was cut out from the cold-rolled and annealed sheet. The sample was degreased with acetone and then subjected to an oxidation test, where the sample was held in a high-temperature environment containing water vapor, specifically, in a heating furnace with an atmosphere of 15 vol. % $H_2O$+air at a temperature of 850° C. for 100 hours. The mass gain by oxidation of the sample before and after the test was then measured, and the oxidation resistance was evaluated based on the following criteria.

Excellent (passed, particularly excellent): the mass gain by oxidation is 0.05 $mg/cm^2$ or less,
Good (passed, excellent): the mass gain by oxidation is more than 0.05 $mg/cm^2$ and 0.10 $mg/cm^2$ or less, and
Poor (failed): the mass gain by oxidation is more than 0.10 $mg/cm^2$.

<Chromium Poisoning Resistance>

A sample having the same shape as the sample used in the evaluation of oxidation resistance was obtained from the cold-rolled and annealed sheet. The prepared sample was loaded into a quartz sample holder in a quartz tube furnace. The sample holder was placed in the center of the tube furnace. A quartz wool was placed downstream of the sample holder to collect the Cr evaporating from the sample. Then, the temperature in the tube furnace was kept at 850° C. for 100 hours while 15 vol. % $H_2O$+ air flowed through the tube furnace. After the holding, all of the Cr adhering to the sample holder and the quartz wool was dissolved in an acid solution, and the Cr concentration in the acid solution was measured using an inductively coupled plasma mass spectrometer (ICP-MS). Then, the amount of Cr contained in the acid solution was calculated from the Cr concentration and the amount of acid solution. Then, the amount of Cr evaporated from each sample was calculated by dividing the amount of Cr in the acid solution by the surface area of the sample. Then, the chromium poisoning resistance was evaluated based on the following criteria:

Good (passed): the amount of Cr evaporation is 1.0 $mg/cm^2$ or less, and
Poor (failed): the amount of Cr evaporation is more than 1.0 $mg/cm^2$.

<Evaluation of Electrical Conductivity>

After the evaluation of oxidation resistance, a 5 mm×5 mm Pt paste was applied to the front and back surfaces of each sample used in the evaluation of oxidation resistance, and each sample was held at 825° C. for 30 min to dry. The heating rate during heating before the holding and the cooling rate during cooling after the holding were both 4° C./min. Then, Pt mesh (10 mm×10 mm) was placed on the Pt paste-applied region on each of the front and back surfaces of each sample. The Pt mesh was prepared by joining Pt wires for current application and Pt wires for voltage measurement by point-welding. Then, each sample was held for 30 minutes in a heating furnace heated to 850° C. with a load of 0.1 $kgf/cm^2$ applied. The heating rate during heating before the holding was 4° C./min. During this holding at 850° C., a current was applied to each sample so that the current density was 0.5 $A/cm^2$, and the voltage at that point was measured to determine the electrical resistance (area resistivity). Then, the electrical resistance value was measured for each sample with n=3, the results were averaged, and the electrical conductivity was evaluated based on the following criteria:

Excellent (passed, particularly excellent): average of electrical resistance is 0.1 $\Omega \cdot cm^2$ or less,
Good (passed, excellent): average of electrical resistance is more than 0.1 $\Omega \cdot cm^2$ and 0.2 $\Omega \cdot cm^2$ or less, and
Poor (failed): average of electrical resistance is more than 0.2 $\Omega \cdot cm^2$

TABLE 1

| Steel sample No. | Chemical composition (mass %) | | | | | | | | | | | | | [Mg]/[Al] | Remarks |
|---|---|---|---|---|---|---|---|---|---|---|---|---|---|---|---|
| | C | Si | Mn | P | S | Cr | Al | Ni | Nb | Mo | Mg | N | Others | | |
| A1 | 0.006 | 0.10 | 0.11 | 0.036 | 0.006 | 20.0 | 0.94 | 0.15 | 0.35 | 1.95 | 0.0010 | 0.0066 | — | 0.0011 | Example |
| A2 | 0.003 | 0.73 | 0.06 | 0.032 | 0.005 | 20.5 | 1.56 | 0.08 | 0.33 | 2.10 | 0.0007 | 0.0030 | — | 0.0004 | Example |
| A3 | 0.004 | 0.17 | 0.95 | 0.033 | 0.008 | 20.1 | 1.01 | 0.98 | 0.51 | 2.32 | 0.0009 | 0.0063 | — | 0.0009 | Example |
| A4 | 0.006 | 0.08 | 0.12 | 0.044 | 0.003 | 14.2 | 0.89 | 0.13 | 0.52 | 2.23 | 0.0025 | 0.0045 | — | 0.0028 | Example |
| A5 | 0.004 | 0.10 | 0.10 | 0.035 | 0.005 | 31.5 | 0.90 | 0.05 | 0.34 | 2.15 | 0.0013 | 0.0061 | — | 0.0014 | Example |
| A6 | 0.005 | 0.07 | 0.06 | 0.020 | 0.007 | 18.9 | 0.58 | 0.04 | 0.46 | 2.16 | 0.0014 | 0.0063 | — | 0.0024 | Example |
| A7 | 0.003 | 0.18 | 0.19 | 0.021 | 0.004 | 19.0 | 1.00 | 0.16 | 0.38 | 1.17 | 0.0011 | 0.0057 | — | 0.0011 | Example |
| A8 | 0.002 | 0.32 | 0.11 | 0.031 | 0.003 | 23.0 | 1.97 | 0.01 | 0.36 | 2.18 | 0.0010 | 0.0045 | — | 0.0005 | Example |
| A9 | 0.005 | 0.21 | 0.09 | 0.034 | 0.005 | 20.0 | 1.05 | 0.14 | 0.46 | 2.93 | 0.0012 | 0.0052 | — | 0.0011 | Example |
| A10 | 0.002 | 0.13 | 0.70 | 0.032 | 0.006 | 19.9 | 0.76 | 0.15 | 0.33 | 2.10 | 0.0025 | 0.0052 | — | 0.0033 | Example |

TABLE 1-continued

| Steel sample No. | Chemical composition (mass %) | | | | | | | | | | | | | [Mg]/[Al] | Remarks |
|---|---|---|---|---|---|---|---|---|---|---|---|---|---|---|---|
| | C | Si | Mn | P | S | Cr | Al | Ni | Nb | Mo | Mg | N | Others | | |
| A11 | 0.004 | 0.09 | 0.16 | 0.033 | 0.007 | 18.9 | 0.93 | 0.17 | 0.16 | 2.29 | 0.0011 | 0.0058 | — | 0.0012 | Example |
| A12 | 0.006 | 0.10 | 0.15 | 0.032 | 0.005 | 19.3 | 1.03 | 0.10 | 0.72 | 2.11 | 0.0016 | 0.0063 | — | 0.0016 | Example |
| A13 | 0.007 | 0.23 | 0.45 | 0.021 | 0.008 | 18.8 | 1.04 | 0.11 | 0.37 | 2.13 | 0.0007 | 0.0058 | — | 0.0007 | Example |
| A14 | 0.005 | 0.12 | 0.10 | 0.034 | 0.007 | 19.3 | 0.99 | 0.05 | 0.35 | 2.16 | 0.0046 | 0.0052 | Cu: 0.07, V: 0.05 | 0.0046 | Example |
| A15 | 0.012 | 0.25 | 0.07 | 0.035 | 0.006 | 20.2 | 1.01 | 0.09 | 0.38 | 2.18 | 0.0025 | 0.0150 | Cu: 0.49 | 0.0025 | Example |
| A16 | 0.009 | 0.16 | 0.12 | 0.030 | 0.003 | 19.6 | 0.96 | 0.08 | 0.32 | 2.25 | 0.0019 | 0.0057 | W: 1.18 | 0.0020 | Example |
| A17 | 0.004 | 0.18 | 0.13 | 0.039 | 0.004 | 19.7 | 0.98 | 0.05 | 0.36 | 2.31 | 0.0013 | 0.0059 | Co: 0.05, Zr: 0.07 | 0.0013 | Example |
| A18 | 0.003 | 0.11 | 0.19 | 0.023 | 0.005 | 20.0 | 1.00 | 0.16 | 0.46 | 2.15 | 0.0011 | 0.0063 | Ti: 0.15, REM: 0.09 | 0.0011 | Example |
| A19 | 0.002 | 0.13 | 0.20 | 0.033 | 0.004 | 19.4 | 0.88 | 0.13 | 0.41 | 2.23 | 0.0008 | 0.0045 | B: 0.0003, V: 0.02, Ca: 0.0008 | 0.0009 | Example |
| B1 | 0.009 | 0.11 | 1.15 | 0.035 | 0.007 | 20.1 | 1.20 | 0.07 | 0.36 | 2.13 | 0.0006 | 0.0060 | — | 0.0005 | Comparative Example |
| B2 | 0.005 | 0.14 | 0.17 | 0.029 | 0.003 | 13.5 | 0.55 | 0.09 | 0.16 | 1.16 | 0.0005 | 0.0070 | — | 0.0009 | Comparative Example |
| B4 | 0.008 | 0.10 | 0.12 | 0.035 | 0.008 | 19.9 | 2.20 | 0.18 | 0.18 | 1.82 | 0.0008 | 0.0060 | — | 0.0004 | Comparative Example |
| B5 | 0.006 | 0.15 | 0.16 | 0.033 | 0.003 | 18.0 | 1.45 | 0.12 | 0.36 | 0.88 | 0.0015 | 0.0060 | — | 0.0010 | Comparative Example |
| B6 | 0.002 | 0.12 | 0.14 | 0.030 | 0.009 | 21.0 | 1.98 | 0.11 | 0.10 | 1.58 | 0.0007 | 0.0062 | — | 0.0004 | Comparative Example |
| B7 | 0.007 | 0.29 | 0.18 | 0.028 | 0.005 | 18.5 | 1.00 | 0.15 | 0.38 | 2.20 | 0.0003 | 0.0052 | — | 0.0003 | Comparative Example |
| B8 | 0.008 | 0.07 | 0.05 | 0.031 | 0.003 | 19.7 | 1.88 | 0.10 | 0.25 | 1.91 | 0.0006 | 0.0033 | — | 0.0003 | Comparative Example |
| B9 | 0.005 | 0.13 | 0.13 | 0.025 | 0.004 | 20.3 | 0.63 | 0.08 | 0.42 | 1.95 | 0.0041 | 0.0057 | — | 0.0065 | Comparative Example |
| B10 | 0.006 | 0.06 | 0.08 | 0.030 | 0.006 | 20.8 | 0.39 | 0.14 | 0.33 | 2.11 | 0.0012 | 0.0044 | — | 0.0031 | Comparative Example |
| B11 | 0.004 | 0.16 | 0.09 | 0.027 | 0.005 | 20.1 | 0.59 | 0.08 | 0.35 | 2.09 | 0.0003 | 0.0039 | — | 0.0005 | Comparative Example |
| B12 | 0.005 | 0.12 | 0.07 | 0.029 | 0.004 | 20.2 | 2.14 | 0.11 | 0.34 | 2.02 | 0.0013 | 0.0047 | — | 0.0006 | Comparative Example |
| B13 | 0.006 | 0.09 | 0.08 | 0.026 | 0.005 | 19.9 | 1.58 | 0.07 | 0.12 | 2.07 | 0.0009 | 0.0042 | — | 0.0006 | Comparative Example |

TABLE 2

| Steel sample No. | Evaluation results | | | Remarks |
|---|---|---|---|---|
| | Oxidation resistance | Chromium poisoning resistance | Electrical conductivity | |
| A1 | Excellent | Good | Excellent | Example |
| A2 | Excellent | Good | Excellent | Example |
| A3 | Excellent | Good | Excellent | Example |
| A4 | Excellent | Good | Excellent | Example |
| A5 | Excellent | Good | Excellent | Example |
| A6 | Excellent | Good | Excellent | Example |
| A7 | Excellent | Good | Excellent | Example |
| A8 | Excellent | Good | Excellent | Example |
| A9 | Excellent | Good | Excellent | Example |
| A10 | Excellent | Good | Excellent | Example |
| A11 | Excellent | Good | Excellent | Example |
| A12 | Excellent | Good | Excellent | Example |
| A13 | Excellent | Good | Excellent | Example |
| A14 | Excellent | Good | Excellent | Example |
| A15 | Excellent | Good | Excellent | Example |
| A16 | Excellent | Good | Excellent | Example |
| A17 | Excellent | Good | Excellent | Example |
| A18 | Excellent | Good | Excellent | Example |
| A19 | Excellent | Good | Excellent | Example |
| B1 | Poor | Poor | Excellent | Comparative Example |
| B2 | Poor | Good | Poor | Comparative Example |
| B4 | Excellent | Good | Poor | Comparative Example |
| B5 | Poor | Poor | Good | Comparative Example |
| B6 | Poor | Poor | Good | Comparative Example |
| B7 | Good | Poor | Excellent | Comparative Example |
| B8 | Good | Poor | Good | Comparative Example |
| B9 | Good | Good | Poor | Comparative Example |
| B10 | Poor | Poor | Good | Comparative Example |
| B11 | Good | Poor | Excellent | Comparative Example |
| B12 | Excellent | Good | Poor | Comparative Example |
| B13 | Poor | Poor | Good | Comparative Example |

As listed in Table 2, all Examples had excellent electrical conductivity as well as excellent oxidation resistance and Cr poisoning resistance in a high-temperature environment containing water vapor.

On the other hand, Steel No. B1, which was a comparative example, could not obtain sufficient oxidation resistance and Cr poisoning resistance because the Mn content exceeded the appropriate range.

Steel No. B2 could not obtain sufficient oxidation resistance and electrical conductivity because the Cr content was not within the appropriate range.

Steel Nos. B4 and B12 could not obtain sufficient electrical conductivity because the Al content exceeded the appropriate range.

Steel No. B5 could not obtain sufficient oxidation resistance and Cr poisoning resistance because the Mo content was not within the appropriate range.

Steel Nos. B6 and B13 could not obtain sufficient oxidation resistance and Cr poisoning resistance because the Nb content was not within the appropriate range.

Steel No. B7 could not obtain sufficient Cr poisoning resistance because the Mg content was not within the appropriate range, and [Mg]/[Al] was not within the appropriate range, either.

Steel No. B8 could not obtain sufficient Cr poisoning resistance because [Mg]/[Al] was not within the appropriate range.

Steel No. B9 could not obtain sufficient electrical conductivity because [Mg]/[Al] exceeded the appropriate range.

Steel No. B10 could not obtain sufficient oxidation resistance and Cr poisoning resistance because the Al content was not within the appropriate range.

Steel No. B11 could not obtain sufficient Cr poisoning resistance because the Mg content was not within the appropriate range.

INDUSTRIAL APPLICABILITY

The ferritic stainless steel for solid oxide fuel cells of the present disclosure can be used for solid oxide fuel cells, especially for their interconnectors, cell frames, cell sealant, end plates and peripheral components such as heat exchangers and reformers. The ferritic stainless steel for solid oxide fuel cells of the present disclosure can also be suitably used for other fuel cells and automotive materials, as well as materials for boilers and gas turbines and the like where the material deteriorates due to volatilization of Cr-based oxides.

REFERENCE SIGNS LIST 1 electrolyte
2 electrode (cathode, air electrode)
3 electrode (anode, fuel electrode)
4 interconnector (separator)
5 fuel gas (hydrogen gas)
6 oxidizing gas (air)
7 gas flow path (groove)

The invention claimed is:

1. A ferritic stainless steel for solid oxide fuel cells having improved oxidation resistance, chromium poisoning resistance, and electrical conductivity, comprising a chemical composition consisting of, in mass %, C: 0.025% or less,
Si: 0.05% to 1.00%,
Mn: 0.05% to 1.00%,
P: 0.050% or less,
S: 0.010% or less,
Cr: 14.0% to 32.0%,
Al: 0.55% to 2.00%,
Ni: 0.01% to 1.00%,
Nb: 0.15% to 1.00%,
Mo: 2.10% to 3.00%,
Mg: 0.0005% to 0.0100%, and
N: 0.025% or less,
optionally, at least one selected from the group consisting of
Co: 0.01% to 1.00%,
W: 0.01% to 3.00%,
Ti: 0.01% to 0.50%,
V: 0.01% to 0.50%,
Zr: 0.01% to 0.50%,
B: 0.0002% to 0.0050%,
Ca: 0.0002% to 0.0050%, and
REM: 0.01% to 0.20%,
with the balance being Fe and inevitable impurities, wherein a relationship of 0.0004≤[Mg]/[Al]≤0.0050 is satisfied,
where [Al] and [Mg] are the Al content in mass % and the Mg content in mass % in the chemical composition, respectively.

2. The ferritic stainless steel for solid oxide fuel cells according to claim 1, wherein the relationship of 0.0004≤[Mg]/[Al]≤0.0030 is satisfied.

* * * * *